United States Patent
Yang

(10) Patent No.: US 8,820,104 B2
(45) Date of Patent: *Sep. 2, 2014

(54) TEMPERATURE REGULATION SYSTEM WITH ACTIVE JETTING TYPE REFRIGERANT SUPPLY AND REGULATION

(76) Inventor: Tai-Her Yang, Dzan-Hwa (TW)

( * ) Notice: Subject to any disclaimer, the term of this patent is extended or adjusted under 35 U.S.C. 154(b) by 206 days.

This patent is subject to a terminal disclaimer.

(21) Appl. No.: 12/946,918

(22) Filed: Nov. 16, 2010

(65) Prior Publication Data

US 2012/0096882 A1    Apr. 26, 2012

Related U.S. Application Data

(63) Continuation-in-part of application No. 12/940,144, filed on Nov. 5, 2010, now abandoned, and a continuation-in-part of application No. 12/909,916, filed on Oct. 22, 2010, now abandoned.

(51) Int. Cl.
| | |
|---|---|
| F25B 41/04 | (2006.01) |
| F25B 49/00 | (2006.01) |
| G05D 23/12 | (2006.01) |
| F25B 41/00 | (2006.01) |
| F25B 41/06 | (2006.01) |
| F28F 9/02 | (2006.01) |

(52) U.S. Cl.
CPC .............. *F25B 41/00* (2013.01); *F25B 41/062* (2013.01); *F25B 2600/2513* (2013.01); *F28F 9/0265* (2013.01)
USPC ................ 62/222; 62/223; 62/132; 236/92 B

(58) Field of Classification Search
USPC ........... 62/180, 117, 222, 223, 132; 236/92 B
See application file for complete search history.

(56) References Cited

U.S. PATENT DOCUMENTS

| | | | | |
|---|---|---|---|---|
| 6,672,091 | B1 * | 1/2004 | Lefor et al. | 62/223 |
| 7,159,407 | B2 * | 1/2007 | Chen | 62/100 |
| 7,841,208 | B2 * | 11/2010 | Lefor | 62/527 |
| 2008/0307810 | A1 * | 12/2008 | VanderZee | 62/222 |
| 2012/0096880 | A1 * | 4/2012 | Yang | 62/126 |
| 2012/0117992 | A1 * | 5/2012 | Yang | 62/126 |
| 2012/0117994 | A1 * | 5/2012 | Yang | 62/149 |

* cited by examiner

*Primary Examiner* — Chen Wen Jiang
(74) *Attorney, Agent, or Firm* — Bacon & Thomas, PLLC

(57) ABSTRACT

This invention is characterized by an air conditioning system that jets actively a refrigerant into an evaporator in an active jetting manner so as to enhance the diffusibility and uniformity thereof.

21 Claims, 6 Drawing Sheets

TEMPERATURE REGULATION SYSTEM WITH ACTIVE JETTING TYPE REFRIGERANT SUPPLY AND REGULATION

CROSS-REFERENCE TO RELATED APPLICATION

This application is a Continuation-In-Part of application Ser. No. 12/940,144, filed on Nov. 5, 2010, which is a Continuation-In-Part of application Ser. No. 12/909,916, filed on Oct. 22, 2010.

BACKGROUND OF THE INVENTION (a) Field of the Invention

This invention relates to an air conditioning system that actively jets a refrigerant into an evaporator in an active jetting manner so as to enhance the diffusibility and uniformity thereof.

(b) Description of the Prior Art

In a conventional temperature regulation system applied for air conditioning or refrigeration, such as an application device applied for integrated or separate heating and cooling air conditioning, ice water air conditioning, refrigerator, refrigeration or temperature-regulating for cooling or heating, dehumidifying, the refrigerant flows typically through a regulation coil or regulation valve so as to be sucked into an evaporator, the diffusibility and uniformity thereof being poor.

SUMMARY OF THE INVENTION

The temperature regulation system with active jetting type refrigerant supply and regulation of this invention is a temperature regulation system with active jetting type refrigerant supply and regulation providing an application device applied for integrated or separate heating and cooling air conditioning, ice water air conditioning, refrigerator, refrigeration or temperature-regulating for cooling or heating, dehumidifying, which is an air conditioning system having a refrigerant jetting device disposed on an evaporator so as to jet the refrigerant from a conventional pressure reduction throttle device (R100) to the evaporator in a pressurized jetting manner, regulating the jetting direction of the refrigerant jetting device, the pressurized jetting set amount and the jetting pressure intensity to the internal of the evaporator (EVA100) by means of an electric control device (ECU100).

DESCRIPTION OF MAIN COMPONENT SYMBOLS

CD100: drive circuit device
CON100: condenser
ECU100: electric control device
EVA100: evaporator
F101、F102: fan
HD100: liquid refrigerant detection device
HE100: heat-exchanging device
IJ100: refrigerant jetting device
OID100: operation input device
P100: pipe
P200: secondary side pipe
PUMP100: compression pump
R100: pressure reduction throttle device
REF100: refrigerant
TD100: temperature detection device

DETAILED DESCRIPTION OF THE PREFERRED EMBODIMENTS

In a conventional temperature regulation system applied for air conditioning or refrigeration, such as an application device applied for integrated or separate heating and cooling air conditioning, ice water air conditioning, refrigerator, refrigeration or temperature-regulating for cooling or heating, dehumidifying, the refrigerant flows typically through a regulation coil or regulation valve so as to be sucked into an evaporator, the diffusibility and uniformity thereof being poor;

this invention relates to an air conditioning system that actively jets a refrigerant into an evaporator in an active jetting manner so as to enhance the diffusibility and uniformity thereof;

the temperature regulation system with active jetting type refrigerant supply and regulation of this invention is a temperature regulation system with active jetting type refrigerant supply and regulation providing an application device applied for integrated or separate heating and cooling air conditioning, ice water air conditioning, refrigerator, refrigeration or temperature-regulating for cooling or heating, dehumidifying, which is an air conditioning system having a refrigerant jetting device disposed on an evaporator so as to jet the refrigerant from a conventional pressure reduction throttle device (R100) to the evaporator in a pressurized jetting manner, regulating the jetting direction of the refrigerant jetting device, the pressurized jetting set amount and the jetting pressure intensity to the internal of the evaporator (EVA100) by means of an electric control device (ECU100).

Figure 1:
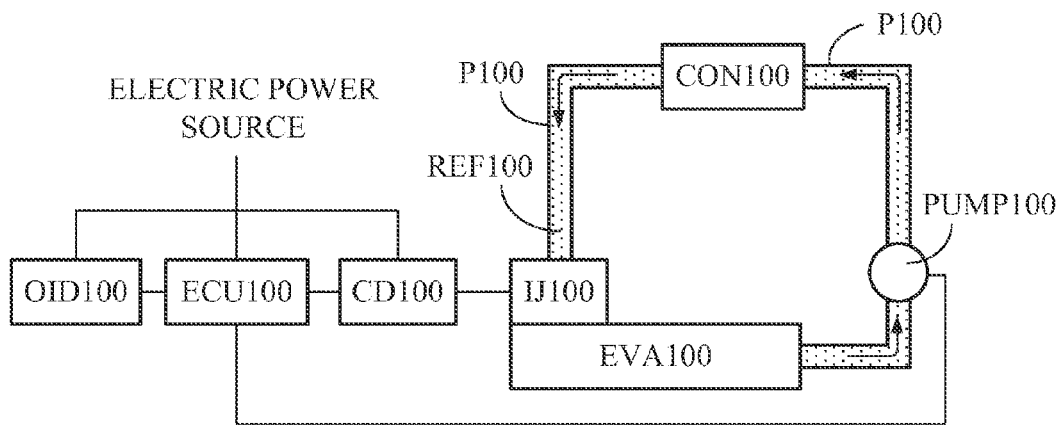
FIG. 1 is a schematic view of the main system configuration according to the system basic principle of this invention.

The various embodiments of the temperature regulation system with active jetting type refrigerant supply and regulation will be described as follows:

FIG. 1 is a schematic view of the main system configuration according to the system basic principle of this invention;

As shown in FIG. 1, the temperature regulation system mainly comprises:

an operation input device (OID100), formed by a manually operative electromechanical interface or a circuit device inputted by an analog or digital operation signal, for performing the actuation/shutdown of the system, selecting the operation modes, setting the regulation temperature, and setting the amount of an airflow when a fan is provided, etc.;

an electric control device (ECU100), formed by an electromechanical operation device, a solid electronic circuit device and a microprocessor and related softwares so as to receive and process a command from the operation input device (OID100), for operating a drive circuit device (CD100) to further drive a refrigerant jetting device (IJ100), thereby controlling the timing of a liquid refrigerant (REF100) from a condenser (CON100) through the refrigerant jetting device (IJ100) to pressurize and jet the same into an interior of an evaporator (EVA100);

the drive circuit device (CD100), receiving the operation command from the electric control device (ECU100) to drive the refrigerant jetting device (IJ100), spraying the liquid refrigerant (REF100) from a condenser (CON100) into the evaporator (EVA100) in a fixed or periodical scan driving direction with a pressurized jetting set amount and set intensity in the form of a stream or fine particles or fine mists;

the refrigerant jetting device (IJ100), provided with one or more than one active pressurized jetting device driven by mechanical force or electromagnetic force or magnetostriction or piezoelectric effect, incorporated with the evaporator (EVA100) or formed integrally with the evaporator (EVA100) so as to be driven by the drive circuit device (CD100), for spraying the liquid refrigerant (REF100) from the condenser (CON100) into the evaporator (EVA100) in the fixed or periodical scan driving direction, with the pressurized jetting set amount and set intensity in the form of a stream or fine particles or fine mists;

the evaporator (EVA100), formed by a material of a good heat conductivity, having a space formed therein so as to allow a fluid to pass through, the evaporator (EVA100) being provided with the refrigerant jetting device (IJ100) for jetting the refrigerant (REF100) from the condenser (CON100), and an outlet for the escape of a vaporized gas refrigerant (REF100) or the discharge of an incompletely vaporized liquid refrigerant (REF100);

a compression pump (PUMP100), which is a fluid compression pump to be rotationally or reciprocally driven by a mechanical force or motor force or a hydrodynamic motor or engine or an electromagnetic coil for compressing the gas refrigerant (REF100) from the evaporator (EVA100) to the condenser (CON100) so as to convert the same into a liquid phase;

the condenser (CON100), formed by a material of a good heat conductivity, having a space formed therein so as to allow the refrigerant (REF100) to pass through;

a pipe (P100), coupling the refrigerant jetting device (IJ100), the evaporator (EVA100), the compression pump (PUMP100), the condenser (CON100) for circulating the refrigerant (REF100) therein.

Figure 2:
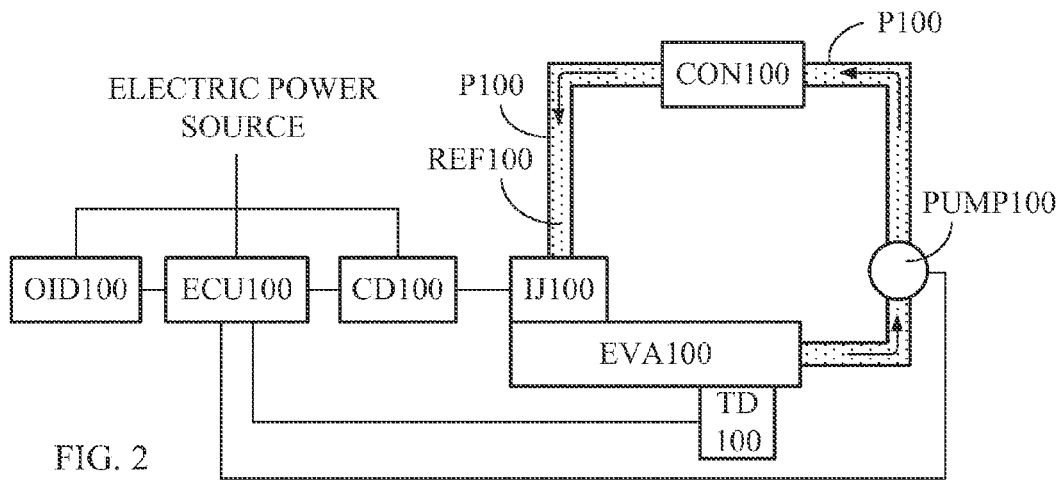
FIG. 2 is a schematic view of the main system configuration of FIG. 1 in which a temperature detection device (TD100) is added.

FIG. 2 is a schematic view of the main system configuration of FIG. 1 in which a temperature detection device (TD100) is added;

As shown in FIG. 2, the temperature regulation system mainly comprises:

an operation input device (OID100), formed by a manually operative electromechanical interface or a circuit device inputted by an analog or digital operation signal, for performing the actuation/shutdown of the system, selecting the operation modes, setting the regulation temperature, and setting the amount of an airflow when a fan is provided, etc.;

a temperature detection device (TD100), detecting the temperature generated from the evaporator so as to supply the same to an electric control device (ECU100);

an electric control device (ECU100), formed by an electromechanical operation device, a solid electronic circuit device and a microprocessor and related softwares so as to receive and process a command from the operation input device (OID100) and a detection signal of a temperature detection device (TD100) for operating a drive circuit device (CD100) to further drive a refrigerant jetting device (IJ100), thereby controlling the timing of a liquid refrigerant (REF100) from a condenser (CON100) through the refrigerant jetting device (IJ100) to pressurize and jet the same into an interior of an evaporator (EVA100);

the drive circuit device (CD100), receiving the operation command from the electric control device (ECU100) to drive the refrigerant jetting device (IJ100), spraying the liquid refrigerant (REF100) from a condenser (CON100) into the evaporator (EVA100) in a fixed or periodical scan driving direction with a pressurized jetting set amount and set intensity in the form of a stream or fine particles or fine mists;

the refrigerant jetting device (IJ100), provided with one or more than one active pressurized jetting device driven by mechanical force or electromagnetic force or magnetostriction or piezoelectric effect, incorporated with the evaporator (EVA100) or formed integrally with the evaporator (EVA100) so as to be driven by the drive circuit device (CD100), for spraying the liquid refrigerant (REF100) from the condenser (CON100) into the evaporator (EVA100) in the fixed or periodical scan driving direction, with the pressurized jetting set amount and set intensity in the form of a stream or fine particles or fine mists;

the evaporator (EVA100), formed by a material of a good heat conductivity, having a space formed therein so as to allow a fluid to pass through, the evaporator (EVA100) being provided with the refrigerant jetting device (IJ100) for jetting the refrigerant (REF100) from the condenser (CON100), and an outlet for the escape of a vaporized gas refrigerant (REF100) or the discharge of an incompletely vaporized liquid refrigerant (REF100);

a compression pump (PUMP100), which is a fluid compression pump to be rotationally or reciprocally driven by a mechanical force or motor force or a hydrodynamic motor or engine or an electromagnetic coil for compressing the gas refrigerant (REF100) from the evaporator (EVA100) to the condenser (CON100) so as to convert the same into a liquid phase;

the condenser (CON100), formed by a material of a good heat conductivity, having a space formed therein so as to allow the refrigerant (REF100) to pass through;

a pipe (P100), coupling the refrigerant jetting device (IJ100), the evaporator (EVA100), the compression pump (PUMP100), the condenser (CON100) for circulating the refrigerant (REF100) therein.

Figure 3:
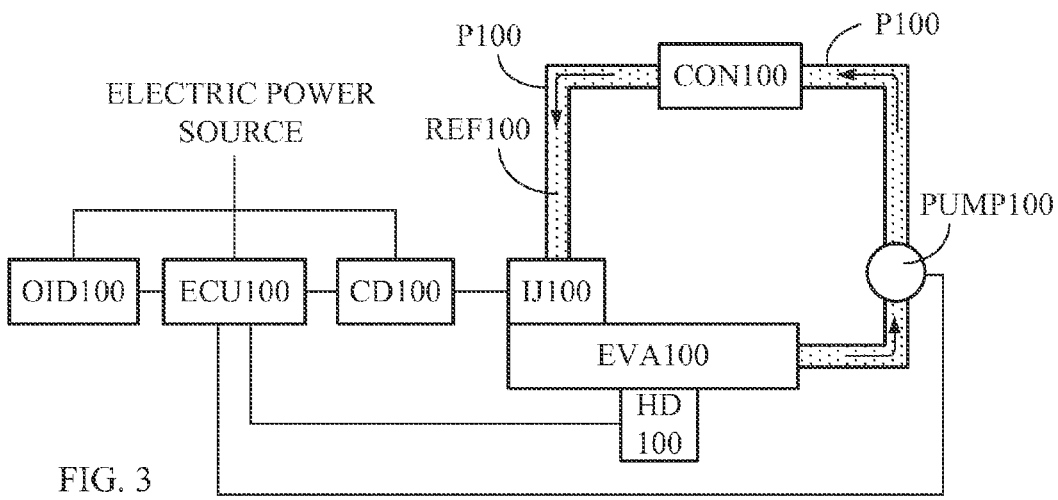
FIG. 3 is a schematic view of the main system configuration of FIG. 1 in which a liquid refrigerant detection device (HD100) is added.

FIG. 3 is a schematic view of the main system configuration of FIG. 1 in which a liquid refrigerant detection device (HD100) is added;

As shown in FIG. 3, the temperature regulation system mainly comprises:

an operation input device (OID100), formed by a manually operative electromechanical interface or a circuit device inputted by an analog or digital operation signal, for performing the actuation/shutdown of the system, selecting the operation modes, setting the regulation temperature, and setting the amount of an airflow when a fan is provided, etc.;

an electric control device (ECU100), formed by an electromechanical operation device, a solid electronic circuit device and a microprocessor and related softwares so as to receive and process a command from the operation input device (OID100) and the detection signal of a liquid refrigerant detection device (HD100), for operating a drive circuit device (CD100) to further drive a refrigerant jetting device (IJ100), thereby controlling the timing of a liquid refrigerant (REF100) from a condenser (CON100) through the refrigerant jetting device (IJ100) to pressurize and jet the same into an interior of an evaporator (EVA100);

the drive circuit device (CD100), receiving the operation command from the electric control device (ECU100) to drive the refrigerant jetting device (IJ100), spraying the liquid refrigerant (REF100) from a condenser (CON100) into the evaporator (EVA100) in a fixed or periodical scan driving direction with a pressurized jetting set amount and set intensity in the form of a stream or fine particles or fine mists;

the refrigerant jetting device (IJ100), provided with one or more than one active pressurized jetting device driven by mechanical force or electromagnetic force or magnetostriction or piezoelectric effect, incorporated with the evaporator (EVA100) or formed integrally with the evaporator (EVA100) so as to be driven by the drive circuit device (CD100), for spraying the liquid refrigerant (REF100) from the condenser (CON100) into the evaporator (EVA100) in the fixed or periodical scan driving direction, with the pressurized jetting set amount and set intensity in the form of a stream or fine particles or fine mists;

the evaporator (EVA100), formed by a material of a good heat conductivity, having a space formed therein so as to allow a fluid to pass through, the evaporator (EVA100) being provided with the refrigerant jetting device (IJ100) for jetting the refrigerant (REF100) from the condenser (CON100), and an outlet for the escape of a vaporized gas refrigerant (REF100) or the discharge of an incompletely vaporized liquid refrigerant (REF100);

a liquid refrigerant detection device (HD100), disposed in the evaporator (EVA100) for detecting an evaporation status of the refrigerant (REF100) within the evaporator (EVA100), a signal being transmitted back to the electric control device (ECU100) when the refrigerant (REF100) is not completely vaporized and a residual liquid refrigerant (REF100) is present, so that the electric control device (ECU100) operatively controls the drive circuit device (CD100) to regulate the refrigerant jetting device (IJ100) to reduce the jetting amount of the refrigerant (REF100) into the evaporator (EVA100);

a compression pump (PUMP100), which is a fluid compression pump to be rotationally or reciprocally driven by a mechanical force or motor force or a hydrodynamic motor or engine or an electromagnetic coil for compressing the gas refrigerant (REF100) from the evaporator (EVA100) to the condenser (CON100) so as to convert the same into a liquid phase;

the condenser (CON100), formed by a material of a good heat conductivity, having a space formed therein so as to allow the refrigerant (REF100) to pass through;

a pipe (P100), coupling the refrigerant jetting device (IJ100), the evaporator (EVA100), the compression pump (PUMP100), the condenser (CON100) for circulating the refrigerant (REF100) therein.

Figure 4:
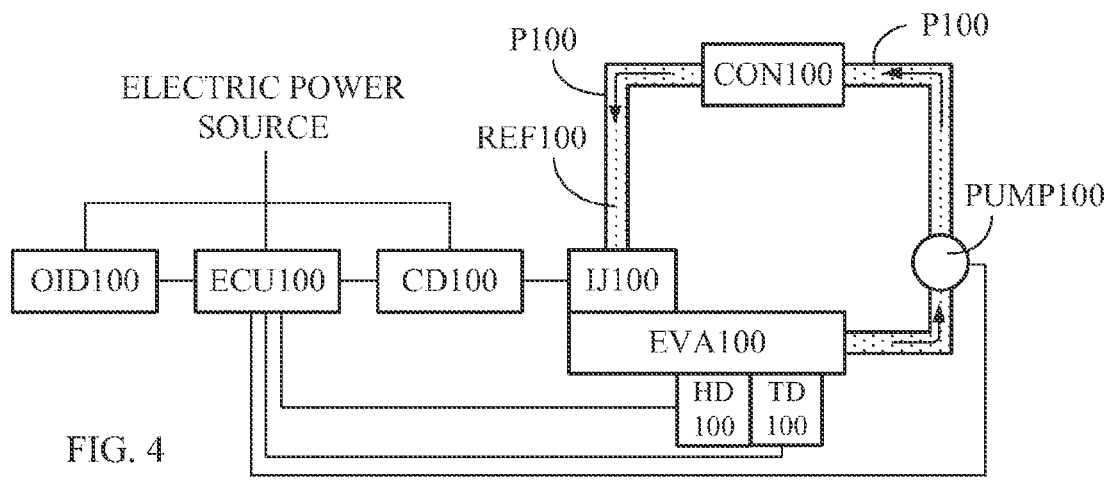
FIG. 4 is a schematic view of the main system configuration of FIG. 1 in which a temperature detection device (TD100) and a liquid refrigerant detection device (HD100) are added.

FIG. 4 is a schematic view of the main system configuration of FIG. 1 in which a temperature detection device (TD100) and a liquid refrigerant detection device (HD100) are added;

As shown in FIG. 4, the temperature regulation system mainly comprises:

an operation input device (OID100), formed by a manually operative electromechanical interface or a circuit device inputted by an analog or digital operation signal, for performing the actuation/shutdown of the system, selecting the operation modes, setting the regulation temperature, and setting the amount of an airflow when a fan is provided, etc.;

a temperature detection device (TD100), detecting the temperature generated from the evaporator so as to supply the same to an electric control device (ECU100);

an electric control device (ECU100), formed by an electromechanical operation device, a solid electronic circuit device and a microprocessor and related softwares so as to receive and process a command from the operation input device (OID100), the detection signal of a temperature detection device (TD100), and the detection signal of a liquid refrigerant detection device (HD100), for operating a drive circuit device (CD100) to further drive a refrigerant jetting device (IJ100), thereby controlling the timing of a liquid refrigerant (REF100) from a condenser (CON100) through the refrigerant jetting device (IJ100) to pressurize and jet the same into an interior of an evaporator (EVA100);

the drive circuit device (CD100), receiving the operation command from the electric control device (ECU100) to drive the refrigerant jetting device (IJ100), spraying the liquid refrigerant (REF100) from a condenser (CON100) into the evaporator (EVA100) in a fixed or periodical scan driving direction with a pressurized jetting set amount and set intensity in the form of a stream or fine particles or fine mists;

the refrigerant jetting device (IJ100), provided with one or more than one active pressurized jetting device driven by mechanical force or electromagnetic force or magnetostriction or piezoelectric effect, incorporated with the evaporator (EVA100) or formed integrally with the evaporator (EVA100) so as to be driven by the drive circuit device (CD100), for spraying the liquid refrigerant (REF100) from the condenser (CON100) into the evaporator (EVA100) in the fixed or periodical scan driving direction, with the pressurized jetting set amount and set intensity in the form of a stream or fine particles or fine mists;

the evaporator (EVA100), formed by a material of a good heat conductivity, having a space formed therein so as to allow a fluid to pass through, the evaporator (EVA100) being provided with the refrigerant jetting device (IJ100) for jetting the refrigerant (REF100) from the condenser (CON100), and an outlet for the escape of a vaporized gas refrigerant (REF100) or the discharge of an incompletely vaporized liquid refrigerant (REF100);

a liquid refrigerant detection device (HD100), disposed in the evaporator (EVA100) for detecting an evaporation status of the refrigerant (REF100) within the evaporator (EVA100), a signal being transmitted back to the electric control device (ECU100) when the refrigerant (REF100) is not completely vaporized and a residual liquid refrigerant (REF100) is present, so that the electric control device (ECU100) operatively controls the drive circuit device (CD100) to regulate the refrigerant jetting device (IJ100) to reduce the jetting amount of the refrigerant (REF100) into the evaporator (EVA100);

a compression pump (PUMP100), which is a fluid compression pump to be rotationally or reciprocally driven by a mechanical force or motor force or a hydrodynamic motor or engine or an electromagnetic coil for compressing the gas refrigerant (REF100) from the evaporator (EVA100) to the condenser (CON100) so as to convert the same into a liquid phase;

the condenser (CON100), formed by a material of a good heat conductivity, having a space formed therein so as to allow the refrigerant (REF100) to pass through;

a pipe (P100), coupling the refrigerant jetting device (IJ100), the evaporator (EVA100), the compression pump (PUMP100), the condenser (CON100) for circulating the refrigerant (REF100) therein.

Figure 5:
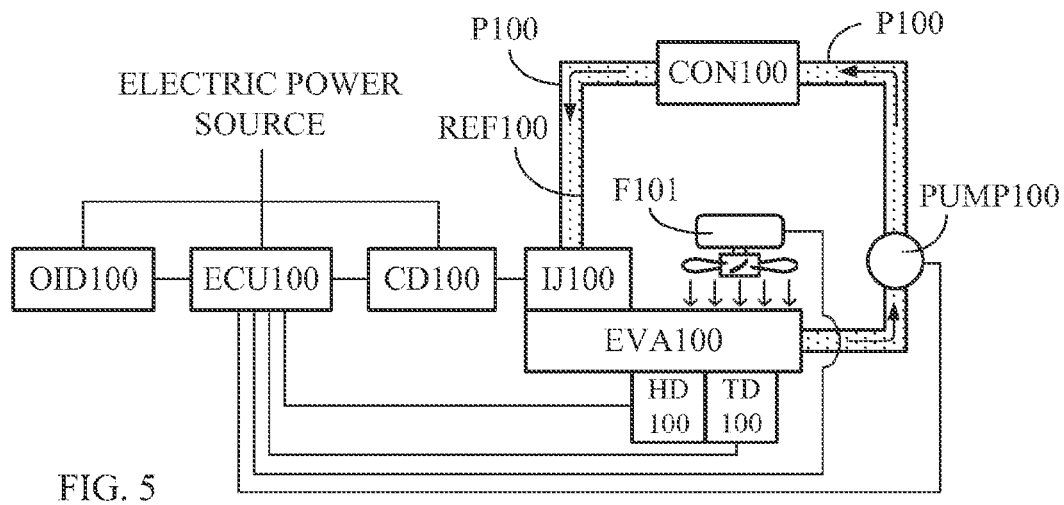
FIG. 5 is a schematic view of the main system configuration of FIG. 4 in which a fan (F101) for blowing the airflow through an evaporator (EVA100) is added.

FIG. 5 is a schematic view of the main system configuration of FIG. 4 in which a fan (F101) for blowing the airflow through an evaporator (EVA100) is added;

As shown in FIG. 5, the temperature regulating system mainly comprises:

an operation input device (OID100), formed by a manually operative electromechanical interface or a circuit device inputted by an analog or digital operation signal, for performing the actuation/shutdown of the system, selecting the operation modes, setting the regulation temperature, and setting the amount of an airflow when a fan is provided, etc.;

a temperature detection device (TD100), detecting the temperature generated from the evaporator so as to supply the same to an electric control device (ECU100);

an electric control device (ECU100), formed by an electromechanical operation device, a solid electronic circuit device and a microprocessor and related softwares so as to receive and process a command from the operation input device (OID100), the detection signal of a temperature detection device (TD100), and the detection signal of a liquid refrigerant detection device (HD100), for operating a drive circuit device (CD100) to further drive a refrigerant jetting device (IJ100), thereby controlling the timing of a liquid refrigerant (REF100) from a condenser (CON100) through the refrigerant jetting device (IJ100) to pressurize and jet the same into an interior of an evaporator (EVA100);

the drive circuit device (CD100), receiving the operation command from the electric control device (ECU100) to drive the refrigerant jetting device (IJ100), spraying the liquid refrigerant (REF100) from a condenser (CON100) into the evaporator (EVA100) in a fixed or periodical scan driving direction with a pressurized jetting set amount and set intensity in the form of a stream or fine particles or fine mists;

the refrigerant jetting device (IJ100), provided with one or more than one active pressurized jetting device driven by mechanical force or electromagnetic force or magnetostriction or piezoelectric effect, incorporated with the evaporator (EVA100) or formed integrally with the evaporator (EVA100) so as to be driven by the drive circuit device (CD100), for spraying the liquid refrigerant (REF100) from the condenser (CON100) into the evaporator (EVA100) in the fixed or periodical scan driving direction, with the pressurized jetting set amount and set intensity in the form of a stream or fine particles or fine mists;

the evaporator (EVA100), formed by a material of a good heat conductivity, having a space formed therein so as to allow a fluid to pass through, the evaporator (EVA100) being provided with the refrigerant jetting device (IJ100) for jetting the refrigerant (REF100) from the condenser (CON100), and an outlet for the escape of a vaporized gas refrigerant (REF100) or the discharge of an incompletely vaporized liquid refrigerant (REF100);

a liquid refrigerant detection device (HD100), disposed in the evaporator (EVA100) for detecting an evaporation status of the refrigerant (REF100) within the evaporator (EVA100), a signal being transmitted back to the electric control device (ECU100) when the refrigerant (REF100) is not completely vaporized and a residual liquid refrigerant (REF100) is present, so that the electric control device (ECU100) operatively controls the drive circuit device (CD100) to regulate the refrigerant jetting device (IJ100) to reduce the jetting amount of the refrigerant (REF100) into the evaporator (EVA100);

a compression pump (PUMP100), which is a fluid compression pump to be rotationally or reciprocally driven by a mechanical force or motor force or a hydrodynamic motor or engine or an electromagnetic coil for compressing the gas refrigerant (REF100) from the evaporator (EVA100) to the condenser (CON100) so as to convert the same into a liquid phase;

the condenser (CON100), formed by a material of a good heat conductivity, having a space formed therein so as to allow the refrigerant (REF100) to pass through;

a pipe (P100), coupling the refrigerant jetting device (IJ100), the evaporator (EVA100), the compression pump (PUMP100), the condenser (CON100) for circulating the refrigerant (REF100) therein;

a fan (F101): driven by an electric motor or mechanical rotational force so as to blow the airflow through the evaporator (EVA100), so that the airflow is discharged after the heat exchange with the evaporator (EVA100).

Figure 6:
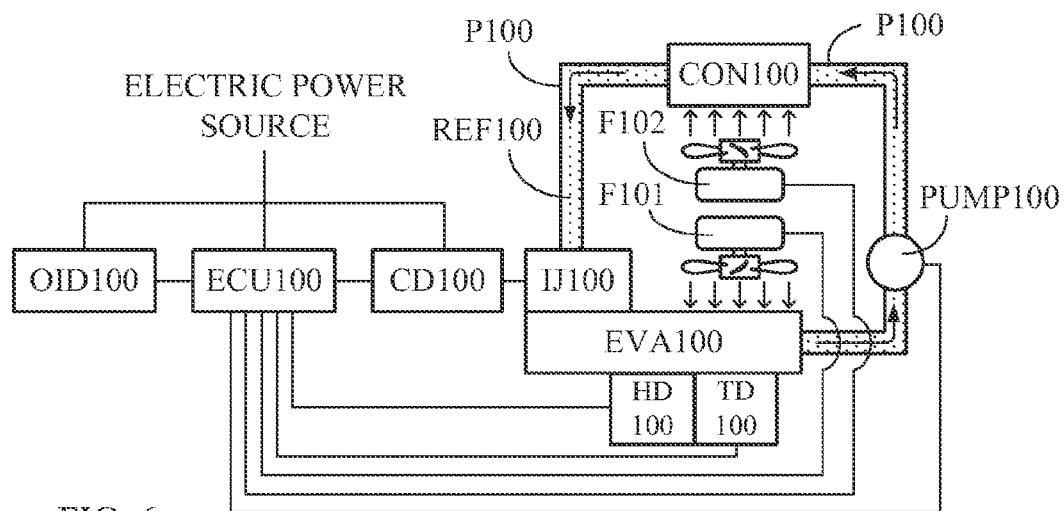
FIG. 6 is a schematic view of the main system configuration of FIG. 4 in which a fan (F101) for blowing the airflow through the evaporator (EVA100), and a fan (F102) for blowing the airflow through a condenser (CON100) are added.

FIG. 6 is a schematic view of the main system configuration of FIG. 4 in which a fan (F101) for blowing the airflow through the evaporator (EVA100), and a fan (F102) for blowing the airflow through a condenser (CON100) are added;

As shown in FIG. 6, the temperature regulation system mainly comprises:

an operation input device (OID100), formed by a manually operative electromechanical interface or a circuit device inputted by an analog or digital operation signal, for performing the actuation/shutdown of the system, selecting the operation modes, setting the regulation temperature, and setting the amount of an airflow when a fan is provided, etc.;

a temperature detection device (TD100), detecting the temperature generated from the evaporator so as to supply the same to an electric control device (ECU100);

an electric control device (ECU100), formed by an electromechanical operation device, a solid electronic circuit device and a microprocessor and related softwares so as to receive and process a command from the operation input device (OID100), the detection signal of a temperature detection device (TD100), and the detection signal of a liquid refrigerant detection device (HD100), for operating a drive circuit device (CD100) to further drive a refrigerant jetting device (IJ100), thereby controlling the timing of a liquid refrigerant (REF100) from a condenser (CON100) through the refrigerant jetting device (IJ100) to pressurize and jet the same into an interior of an evaporator (EVA100);

the drive circuit device (CD100), receiving the operation command from the electric control device (ECU100) to drive the refrigerant jetting device (IJ100), spraying the liquid refrigerant (REF100) from a condenser (CON100) into the evaporator (EVA100) in a fixed or periodical scan driving direction with a pressurized jetting set amount and set intensity in the form of a stream or fine particles or fine mists;

the refrigerant jetting device (IJ100), provided with one or more than one active pressurized jetting device driven by mechanical force or electromagnetic force or magnetostriction or piezoelectric effect, incorporated with the evaporator (EVA100) or formed integrally with the evaporator (EVA100) so as to be driven by the drive circuit device (CD100), for spraying the liquid refrigerant (REF100) from the condenser (CON100) into the evaporator (EVA100) in the fixed or periodical scan driving direction, with the pressurized jetting set amount and set intensity in the form of a stream or fine particles or fine mists;

the evaporator (EVA100), formed by a material of a good heat conductivity, having a space formed therein so as to allow a fluid to pass through, the evaporator (EVA100) being provided with the refrigerant jetting device (IJ100) for jetting the refrigerant (REF100) from the condenser (CON100), and an outlet for the escape of a vaporized gas refrigerant (REF100) or the discharge of an incompletely vaporized liquid refrigerant (REF100);

a liquid refrigerant detection device (HD100), disposed in the evaporator (EVA100) for detecting an evaporation status of the refrigerant (REF100) within the evaporator (EVA100), a signal being transmitted back to the electric control device (ECU100) when the refrigerant (REF100) is not completely vaporized and a residual liquid refrigerant (REF100) is present, so that the electric control device (ECU100) operatively controls the drive circuit device (CD100) to regulate the refrigerant jetting device (IJ100) to reduce the jetting amount of the refrigerant (REF100) into the evaporator (EVA100);

a compression pump (PUMP100), which is a fluid compression pump to be rotationally or reciprocally driven by a mechanical force or motor force or a hydrodynamic motor or engine or an electromagnetic coil for compressing the gas refrigerant (REF100) from the evaporator (EVA100) to the condenser (CON100) so as to convert the same into a liquid phase;

the condenser (CON100), formed by a material of a good heat conductivity, having a space formed therein so as to allow the refrigerant (REF100) to pass through;

a pipe (P100), coupling the refrigerant jetting device (IJ100), the evaporator (EVA100), the compression pump (PUMP100), the condenser (CON100) for circulating the refrigerant (REF100) therein;

a fan (F101): driven by an electric motor or mechanical rotational force so as to blow the airflow through the evaporator (EVA100), so that the airflow is discharged after the heat exchange with the evaporator (EVA100);

a fan (F102), driven by an electric motor or mechanical rotational force, and arranged to blow the airflow through the condenser (CON100) such that the condenser (CON100) performs heat exchange with the airflow.

Figure 7:
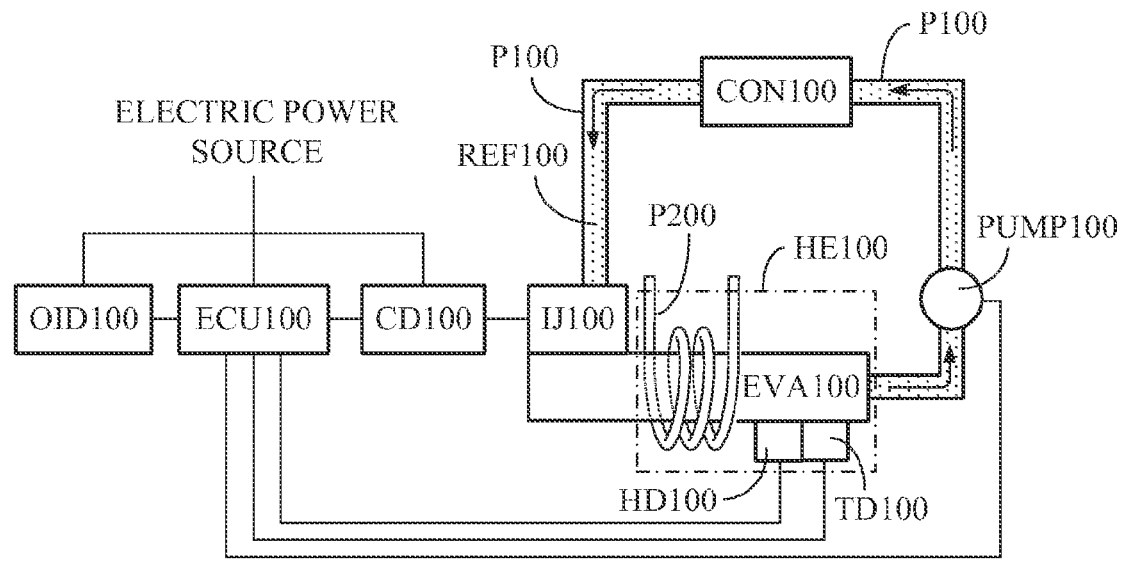
FIG. 7 is a system block schematic view in which the evaporator (EVA100) in the embodiment of FIG. 4 is further combined with a heat-exchanging device (HE100).

FIG. 7 is a system block schematic view in which the evaporator (EVA100) in the embodiment of FIG. 4 is further combined with a heat-exchanging device (HE100);

As shown in FIG. 7, the temperature regulation system mainly comprises:

an operation input device (OID100), formed by a manually operative electromechanical interface or a circuit device inputted by an analog or digital operation signal, for performing the actuation/shutdown of the system, selecting the operation modes, setting the regulation temperature, and setting the amount of an airflow when a fan is provided, etc.;

a temperature detection device (TD100), detecting the temperature generated from the evaporator so as to supply the same to an electric control device (ECU100);

an electric control device (ECU100), formed by an electromechanical operation device, a solid electronic circuit device and a microprocessor and related softwares so as to receive and process a command from the operation input device (OID100), the detection signal of a temperature detection device (TD100), and the detection signal of a liquid refrigerant detection device (HD100), for operating a drive circuit device (CD100) to further drive a refrigerant jetting device (IJ100), thereby controlling the timing of a liquid refrigerant (REF100) from a condenser (CON100) through the refrigerant jetting device (IJ100) to pressurize and jet the same into an interior of an evaporator (EVA100);

the drive circuit device (CD100), receiving the operation command from the electric control device (ECU100) to drive the refrigerant jetting device (IJ100), spraying the liquid refrigerant (REF100) from a condenser (CON100) into the evaporator (EVA100) in a fixed or periodical scan driving direction with a pressurized jetting set amount and set intensity in the form of a stream or fine particles or fine mists;

the refrigerant jetting device (IJ100), provided with one or more than one active pressurized jetting device driven by mechanical force or electromagnetic force or magnetostriction or piezoelectric effect, incorporated with the evaporator (EVA100) or formed integrally with the evaporator (EVA100) so as to be driven by the drive circuit device (CD100), for spraying the liquid refrigerant (REF100) from the condenser (CON100) into the evaporator (EVA100) in the fixed or periodical scan driving direction, with the pressurized jetting set amount and set intensity in the form of a stream or fine particles or fine mists;

the evaporator (EVA100), formed by a material of a good heat conductivity, having a space formed therein so as to allow a fluid to pass through, the evaporator (EVA100) being provided with the refrigerant jetting device (IJ100) for jetting the refrigerant (REF100) from the condenser (CON100), and an outlet for the escape of a vaporized gas refrigerant (REF100) or the discharge of an incompletely vaporized liquid refrigerant (REF100);

a liquid refrigerant detection device (HD100), disposed in the evaporator (EVA100) for detecting an evaporation status of the refrigerant (REF100) within the evaporator (EVA100), a signal being transmitted back to the electric control device (ECU100) when the refrigerant (REF100) is not completely vaporized and a residual liquid refrigerant (REF100) is present, so that the electric control device (ECU100) operatively controls the drive circuit device (CD100) to regulate the refrigerant jetting device (IJ100) to reduce the jetting amount of the refrigerant (REF100) into the evaporator (EVA100);

a compression pump (PUMP100), which is a fluid compression pump to be rotationally or reciprocally driven by a mechanical force or motor force or a hydrodynamic motor or engine or an electromagnetic coil for compressing the gas refrigerant (REF100) from the evaporator (EVA100) to the condenser (CON100) so as to convert the same into a liquid phase;

the condenser (CON100), formed by a material of a good heat conductivity, having a space formed therein so as to allow the refrigerant (REF100) to pass through;

a pipe (P100), coupling the refrigerant jetting device (IJ100), the evaporator (EVA100), the compression pump (PUMP100), the condenser (CON100) for circulating the refrigerant (REF100) therein;

a heat-exchanging device (HE100), configured in a structure that the primary side evaporator (EVA100) and a secondary side pipe (P200) connect one another so as to transfer the thermal energy;

a secondary side pipe (P200), which is the secondary side pipe of the heat-exchanging device (HE100), for passing through a gas or liquid fluid.

Figure 8:
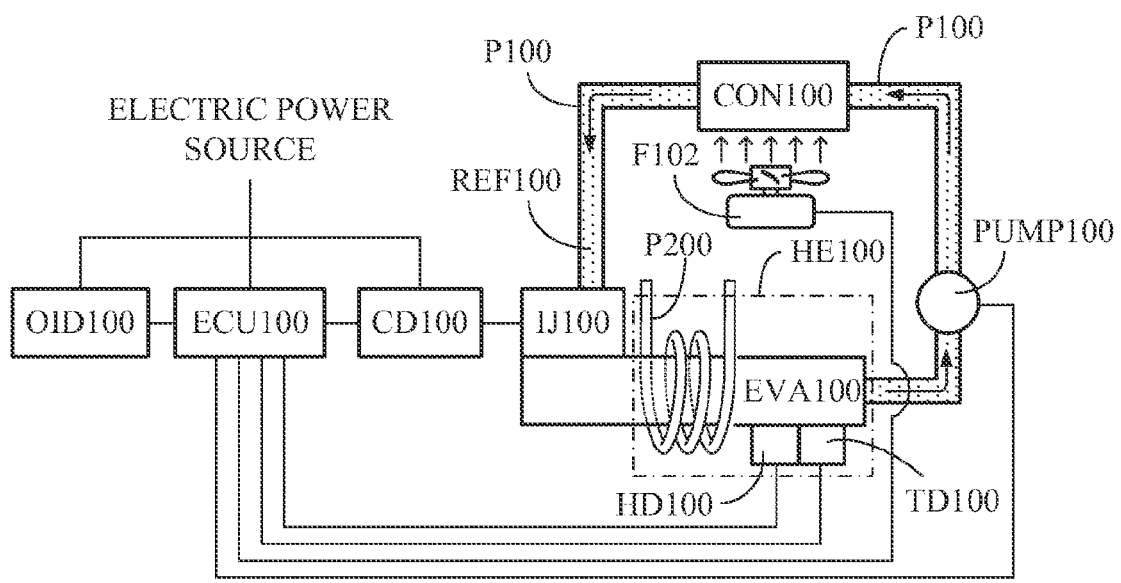
FIG. 8 is system block schematic view in which the fan (F102) is incorporated into FIG. 7.

FIG. 8 is system block schematic view in which the fan (F102) is incorporated into FIG. 7;

As shown in FIG. 8, the temperature regulation system mainly comprises:

an operation input device (OID100), formed by a manually operative electromechanical interface or a circuit device inputted by an analog or digital operation signal, for performing the actuation/shutdown of the system, selecting the operation modes, setting the regulation temperature, and setting the amount of an airflow when a fan is provided, etc.;

a temperature detection device (TD100), detecting the temperature generated from the evaporator so as to supply the same to an electric control device (ECU100);

an electric control device (ECU100), formed by an electromechanical operation device, a solid electronic circuit device and a microprocessor and related softwares so as to receive and process a command from the operation input device (OID100), the detection signal of a temperature detection device (TD100), and the detection signal of a liquid refrigerant detection device (HD100), for operating a drive circuit device (CD100) to further drive a refrigerant jetting device (IJ100), thereby controlling the timing of a liquid refrigerant (REF100) from a condenser (CON100) through the refrigerant jetting device (IJ100) to pressurize and jet the same into an interior of an evaporator (EVA100);

the drive circuit device (CD100), receiving the operation command from the electric control device (ECU100) to drive the refrigerant jetting device (IJ100), spraying the liquid refrigerant (REF100) from a condenser (CON100) into the evaporator (EVA100) in a fixed or periodical scan driving direction with a pressurized jetting set amount and set intensity in the form of a stream or fine particles or fine mists;

the refrigerant jetting device (IJ100), provided with one or more than one active pressurized jetting device driven by mechanical force or electromagnetic force or magnetostriction or piezoelectric effect, incorporated with the evaporator (EVA100) or formed integrally with the evaporator (EVA100) so as to be driven by the drive circuit device (CD100), for spraying the liquid refrigerant (REF100) from the condenser (CON100) into the evaporator (EVA100) in the fixed or periodical scan driving direction, with the pressurized jetting set amount and set intensity in the form of a stream or fine particles or fine mists;

the evaporator (EVA100), formed by a material of a good heat conductivity, having a space formed therein so as to allow a fluid to pass through, the evaporator (EVA100) being provided with the refrigerant jetting device (IJ100) for jetting the refrigerant (REF100) from the condenser (CON100), and an outlet for the escape of a vaporized gas refrigerant (REF100) or the discharge of an incompletely vaporized liquid refrigerant (REF100);

a liquid refrigerant detection device (HD100), disposed in the evaporator (EVA100) for detecting an evaporation status of the refrigerant (REF100) within the evaporator (EVA100), a signal being transmitted back to the electric control device (ECU100) when the refrigerant (REF100) is not completely vaporized and a residual liquid refrigerant (REF100) is present, so that the electric control device (ECU100) operatively controls the drive circuit device (CD100) to regulate the refrigerant jetting device (IJ100) to reduce the jetting amount of the refrigerant (REF100) into the evaporator (EVA100);

a compression pump (PUMP100), which is a fluid compression pump to be rotationally or reciprocally driven by a mechanical force or motor force or a hydrodynamic motor or engine or an electromagnetic coil for compressing the gas refrigerant (REF100) from the evaporator (EVA100) to the condenser (CON100) so as to convert the same into a liquid phase;

the condenser (CON100), formed by a material of a good heat conductivity, having a space formed therein so as to allow the refrigerant (REF100) to pass through;

a pipe (P100), coupling the refrigerant jetting device (IJ100), the evaporator (EVA100), the compression pump (PUMP100), the condenser (CON100) for circulating the refrigerant (REF100) therein;

a heat-exchanging device (HE100), configured in a structure that the primary side evaporator (EVA100) and a secondary side pipe (P200) connect one another so as to transfer the thermal energy;

a secondary side pipe (P200), which is the secondary side pipe of the heat-exchanging device (HE100), for passing through a gas or liquid fluid;

a fan (F102), driven by an electric motor or mechanical rotational force, and arranged to blow the airflow through the condenser (CON100) such that the condenser (CON100) performs heat exchange with the airflow.

Figure 9:
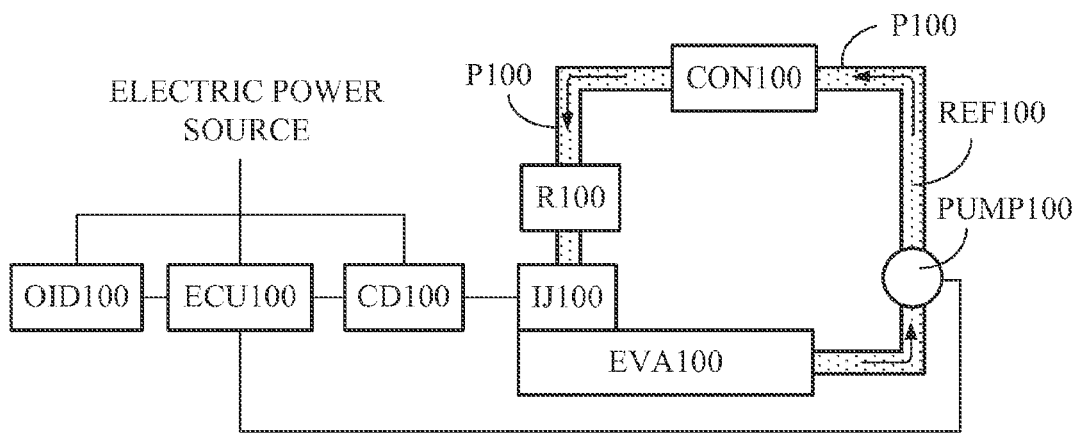
FIG. 9 is a schematic view of the system configuration of FIG. 1 in which a pressure reduction throttle device (R100) is added.

The temperature regulation system with active jetting type refrigerant supply and regulation further connects in series a pressure reduction throttle device (R100) between the flow-path of the condenser (CON100) and the refrigerant jetting device (IJ100) to enhance the stability of the system; and the embodiments thereof are as follows:

FIG. 9 is a schematic view of the system configuration of FIG. 1 in which a pressure reduction throttle device (R100) is added.

As shown in FIG. 9, the temperature regulation system mainly comprises:

an operation input device (OID100), formed by a manually operative electromechanical interface or a circuit device inputted by an analog or digital operation signal, for performing the actuation/shutdown of the system, selecting the operation modes, setting the regulation temperature, and setting the amount of an airflow when a fan is provided, etc.;

an electric control device (ECU100), formed by an electromechanical operation device, a solid electronic circuit device and a microprocessor and related softwares so as to receive and process a command from the operation input device (OID100), for operating a drive circuit device (CD100) to further drive a refrigerant jetting device (IJ100), thereby controlling the timing of a liquid refrigerant (REF100) from a condenser (CON100) through the refrigerant jetting device (IJ100) to pressurize and jet the same into an interior of an evaporator (EVA100);

the drive circuit device (CD100), receiving the operation command from the electric control device (ECU100) to drive the refrigerant jetting device (IJ100), spraying the liquid refrigerant (REF100) from a condenser (CON100) into the evaporator (EVA100) in a fixed or periodical scan driving direction with a pressurized jetting set amount and set intensity in the form of a stream or fine particles or fine mists;

the refrigerant jetting device (IJ100), provided with one or more than one active pressurized jetting device driven by mechanical force or electromagnetic force or magnetostriction or piezoelectric effect, incorporated with the evaporator (EVA100) or formed integrally with the evaporator (EVA100) so as to be driven by the drive circuit device (CD100), for spraying the liquid refrigerant (REF100) from the pressure reduction throttle device (R100) into the evaporator (EVA100) in the fixed or periodical scan driving direction, with the pressurized jetting set amount and set intensity in the form of a stream or fine particles or fine mists;

the evaporator (EVA100), formed by a material of a good heat conductivity, having a space formed therein so as to allow a fluid to pass through, the evaporator (EVA100) being provided with the refrigerant jetting device (IJ100) for jetting the refrigerant (REF100) from the condenser (CON100), and an outlet for the escape of a vaporized gas refrigerant (REF100) or the discharge of an incompletely vaporized liquid refrigerant (REF100);

a compression pump (PUMP100), which is a fluid compression pump to be rotationally or reciprocally driven by a mechanical force or motor force or a hydrodynamic motor or engine or an electromagnetic coil for compressing the gas refrigerant (REF100) from the evaporator (EVA100) to the condenser (CON100) so as to convert the same into a liquid phase;

the condenser (CON100), formed by a material of a good heat conductivity, having a space formed therein so as to allow the refrigerant (REF100) to pass through;

a pressure reduction throttle device (R100): formed by an expansion valve or capillary device or liquid level control device for pressure reduction and throttling of the refrigerant from the condenser (CON100), and disposed between the condenser (CON100) and the refrigerant jetting device (IJ100);

a pipe (P100), coupling the refrigerant jetting device (IJ100), the evaporator (EVA100), the compression pump (PUMP100), the condenser (CON100) for circulating the refrigerant (REF100) therein.

Figure 10:
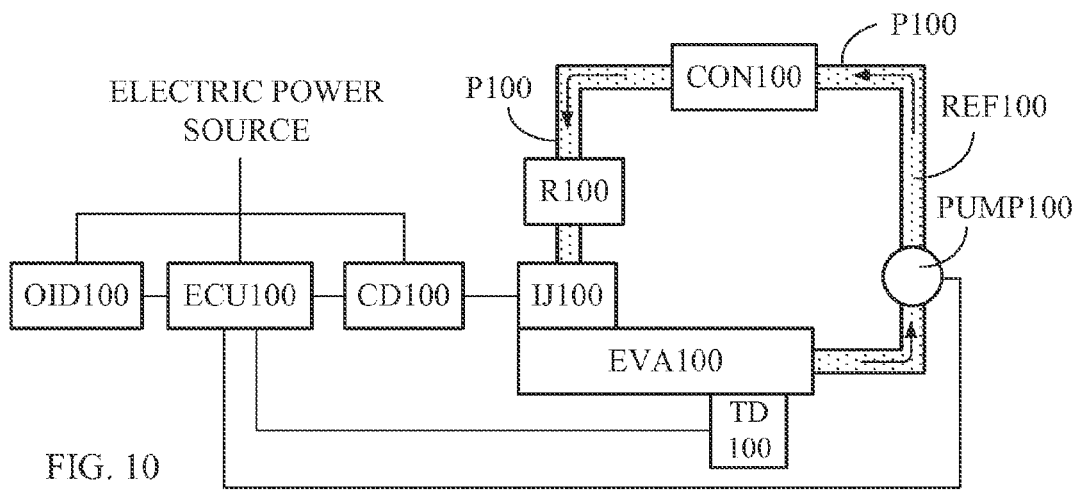
FIG. 10 is a schematic view of the system configuration of FIG. 2 in which a pressure reduction throttle device (R100) is added.

FIG. 10 is a schematic view of the system configuration of FIG. 2 in which a pressure reduction throttle device (R100) is added.

As shown in FIG. 10, the temperature regulation system mainly comprises:

an operation input device (OID100), formed by a manually operative electromechanical interface or a circuit device inputted by an analog or digital operation signal, for performing the actuation/shutdown of the system, selecting the operation modes, setting the regulation temperature, and setting the amount of an airflow when a fan is provided, etc.;

a temperature detection device (TD100), detecting the temperature generated from the evaporator so as to supply the same to an electric control device (ECU100);

an electric control device (ECU100), formed by an electromechanical operation device, a solid electronic circuit device and a microprocessor and related softwares so as to receive and process a command from the operation input device (OID100) and a detection signal of a temperature detection device (TD100) for operating a drive circuit device (CD100) to further drive a refrigerant jetting device (IJ100), thereby controlling the timing of a liquid refrigerant (REF100) from a condenser (CON100) through the refrigerant jetting device (IJ100) to pressurize and jet the same into an interior of an evaporator (EVA100);

the drive circuit device (CD100), receiving the operation command from the electric control device (ECU100) to drive the refrigerant jetting device (IJ100), spraying the liquid refrigerant (REF100) from a condenser (CON100) into the evaporator (EVA100) in a fixed or periodical scan driving direction with a pressurized jetting set amount and set intensity in the form of a stream or fine particles or fine mists;

the refrigerant jetting device (IJ100), provided with one or more than one active pressurized jetting device driven by mechanical force or electromagnetic force or magnetostriction or piezoelectric effect, incorporated with the evaporator (EVA100) or formed integrally with the evaporator (EVA100) so as to be driven by the drive circuit device (CD100), for spraying the liquid refrigerant (REF100) from the pressure reduction throttle device (R100) into the evaporator (EVA100) in the fixed or periodical scan driving direction, with the pressurized jetting set amount and set intensity in the form of a stream or fine particles or fine mists;

the evaporator (EVA100), formed by a material of a good heat conductivity, having a space formed therein so as to allow a fluid to pass through, the evaporator (EVA100) being provided with the refrigerant jetting device (IJ100) for jetting the refrigerant (REF100) from the condenser (CON100), and an outlet for the escape of a vaporized gas refrigerant (REF100) or the discharge of an incompletely vaporized liquid refrigerant (REF100);

a compression pump (PUMP100), which is a fluid compression pump to be rotationally or reciprocally driven by a mechanical force or motor force or a hydrodynamic motor or engine or an electromagnetic coil for compressing the gas refrigerant (REF100) from the evaporator (EVA100) to the condenser (CON100) so as to convert the same into a liquid phase;

the condenser (CON100), formed by a material of a good heat conductivity, having a space formed therein so as to allow the refrigerant (REF100) to pass through;

a pressure reduction throttle device (R100): formed by an expansion valve or capillary device or liquid level control device for pressure reduction and throttling of the refrigerant from the condenser (CON100), and disposed between the condenser (CON100) and the refrigerant jetting device (IJ100);

a pipe (P100), coupling the refrigerant jetting device (IJ100), the evaporator (EVA100), the compression pump (PUMP100), the condenser (CON100) for circulating the refrigerant (REF100) therein.

Figure 11:
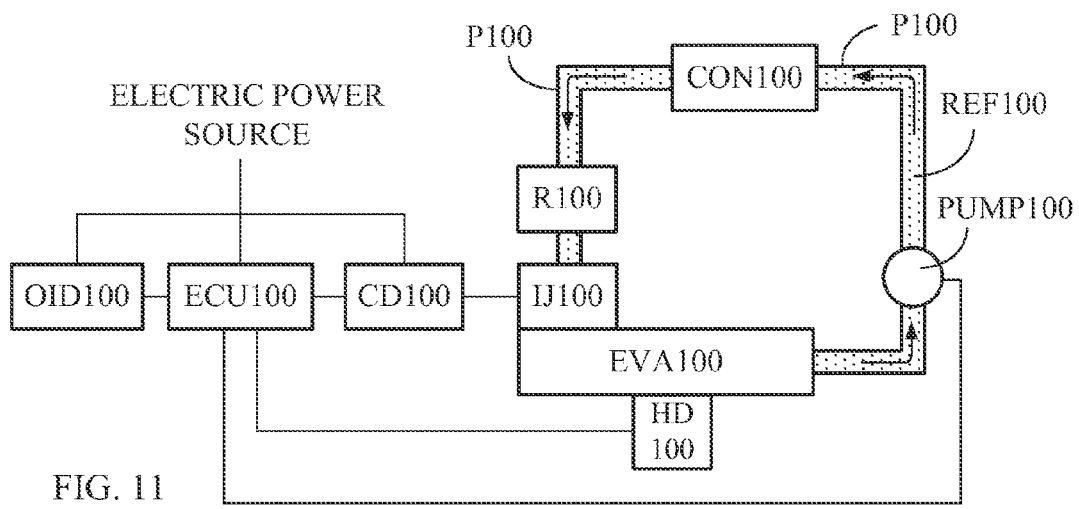
FIG. 11 is a schematic view of the system configuration of FIG. 3 in which a pressure reduction throttle device (R100) is added.

FIG. 11 is a schematic view of the system configuration of FIG. 3 in which a pressure reduction throttle device (R100) is added.

As shown in FIG. 11, the temperature regulation system mainly comprises:

an operation input device (OID100), formed by a manually operative electromechanical interface or a circuit device inputted by an analog or digital operation signal, for performing the actuation/shutdown of the system, selecting the operation modes, setting the regulation temperature, and setting the amount of an airflow when a fan is provided, etc.;

an electric control device (ECU100), formed by an electromechanical operation device, a solid electronic circuit device and a microprocessor and related softwares so as to receive and process a command from the operation input device (OID100) and the detection signal of a liquid refrigerant detection device (HD100), for operating a drive circuit device (CD100) to further drive a refrigerant jetting device (IJ100), thereby controlling the timing of a liquid refrigerant (REF100) from a condenser (CON100) through the refrigerant jetting device (IJ100) to pressurize and jet the same into an interior of an evaporator (EVA100);

the drive circuit device (CD100), receiving the operation command from the electric control device (ECU100) to drive the refrigerant jetting device (IJ100), spraying the liquid refrigerant (REF100) from a condenser (CON100) into the evaporator (EVA100) in a fixed or periodical scan driving direction with a pressurized jetting set amount and set intensity in the form of a stream or fine particles or fine mists;

the refrigerant jetting device (IJ100), provided with one or more than one active pressurized jetting device driven by mechanical force or electromagnetic force or magnetostriction or piezoelectric effect, incorporated with the evaporator (EVA100) or formed integrally with the evaporator (EVA100) so as to be driven by the drive circuit device (CD100), for spraying the liquid refrigerant (REF100) from the pressure reduction throttle device (R100) into the evaporator (EVA100) in the fixed or periodical scan driving direction, with the pressurized jetting set amount and set intensity in the form of a stream or fine particles or fine mists;

the evaporator (EVA100), formed by a material of a good heat conductivity, having a space formed therein so as to allow a fluid to pass through, the evaporator (EVA100) being provided with the refrigerant jetting device (IJ100) for jetting the refrigerant (REF100) from the condenser (CON100), and an outlet for the escape of a vaporized gas refrigerant (REF100) or the discharge of an incompletely vaporized liquid refrigerant (REF100);

a liquid refrigerant detection device (HD100), disposed in the evaporator (EVA100) for detecting an evaporation status of the refrigerant (REF100) within the evaporator (EVA100), a signal being transmitted back to the electric control device (ECU100) when the refrigerant (REF100) is not completely vaporized and a residual liquid refrigerant (REF100) is present, so that the electric control device (ECU100) operatively controls the drive circuit device (CD100) to regulate the refrigerant jetting device (IJ100) to reduce the jetting amount of the refrigerant (REF100) into the evaporator (EVA100);

a compression pump (PUMP100), which is a fluid compression pump to be rotationally or reciprocally driven by a mechanical force or motor force or a hydrodynamic motor or engine or an electromagnetic coil for compressing the gas refrigerant (REF100) from the evaporator (EVA100) to the condenser (CON100) so as to convert the same into a liquid phase;

the condenser (CON100), formed by a material of a good heat conductivity, having a space formed therein so as to allow the refrigerant (REF100) to pass through;

a pressure reduction throttle device (R100): formed by an expansion valve or capillary device or liquid level control device for pressure reduction and throttling of the refrigerant from the condenser (CON100), and disposed between the condenser (CON100) and the refrigerant jetting device (IJ100);

a pipe (P100), coupling the refrigerant jetting device (IJ100), the evaporator (EVA100), the compression pump (PUMP100), the condenser (CON100) for circulating the refrigerant (REF100) therein.

Figure 12:
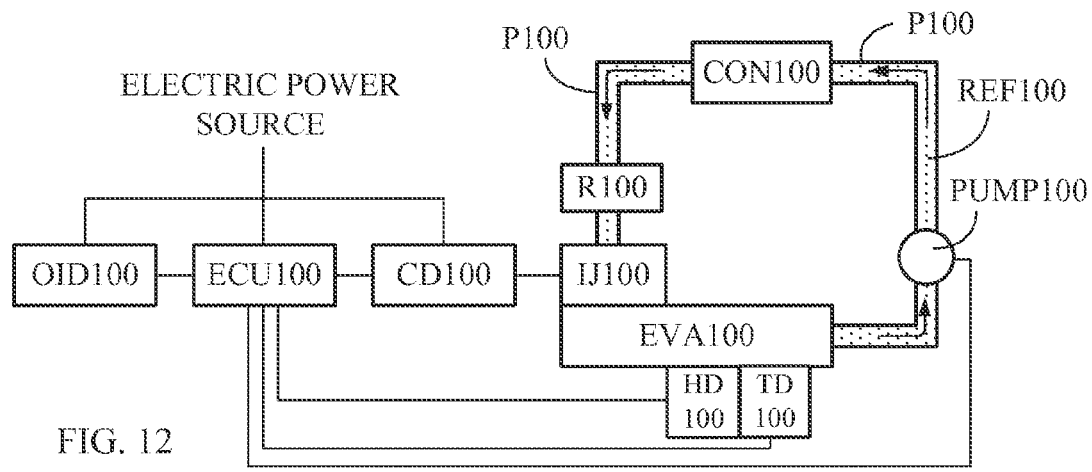
FIG. 12 is a schematic view of the system configuration of FIG. 4 in which a pressure reduction throttle device (R100) is added.

FIG. 12 is a schematic view of the system configuration of FIG. 4 in which a pressure reduction throttle device (R100) is added.

As shown in FIG. 12, the temperature regulation system mainly comprises:

an operation input device (OID100), formed by a manually operative electromechanical interface or a circuit device inputted by an analog or digital operation signal, for performing the actuation/shutdown of the system, selecting the operation modes, setting the regulation temperature, and setting the amount of an airflow when a fan is provided, etc.;

a temperature detection device (TD100), detecting the temperature generated from the evaporator so as to supply the same to an electric control device (ECU100);

an electric control device (ECU100), formed by an electromechanical operation device, a solid electronic circuit device and a microprocessor and related softwares so as to receive and process a command from the operation input device (OID100), the detection signal of a temperature detection device (TD100), and the detection signal of a liquid refrigerant detection device (HD100), for operating a drive circuit device (CD100) to further drive a refrigerant jetting device (IJ100), thereby controlling the timing of a liquid refrigerant (REF100) from a condenser (CON100) through the refrigerant jetting device (IJ100) to pressurize and jet the same into an interior of an evaporator (EVA100);

the drive circuit device (CD100), receiving the operation command from the electric control device (ECU100) to drive the refrigerant jetting device (IJ100), spraying the liquid refrigerant (REF100) from a condenser (CON100) into the evaporator (EVA100) in a fixed or periodical scan driving direction with a pressurized jetting set amount and set intensity in the form of a stream or fine particles or fine mists;

the refrigerant jetting device (IJ100), provided with one or more than one active pressurized jetting device driven by mechanical force or electromagnetic force or magnetostriction or piezoelectric effect, incorporated with the evaporator (EVA100) or formed integrally with the evaporator (EVA100) so as to be driven by the drive circuit device (CD100), for spraying the liquid refrigerant (REF100) from the pressure reduction throttle device (R100) into the evaporator (EVA100) in the fixed or periodical scan driving direction, with the pressurized jetting set amount and set intensity in the form of a stream or fine particles or fine mists;

the evaporator (EVA100), formed by a material of a good heat conductivity, having a space formed therein so as to allow a fluid to pass through, the evaporator (EVA100) being provided with the refrigerant jetting device (IJ100) for jetting the refrigerant (REF100) from the condenser (CON100), and an outlet for the escape of a vaporized gas refrigerant (REF100) or the discharge of an incompletely vaporized liquid refrigerant (REF100);

a liquid refrigerant detection device (HD100), disposed in the evaporator (EVA100) for detecting an evaporation status of the refrigerant (REF100) within the evaporator (EVA100), a signal being transmitted back to the electric control device (ECU100) when the refrigerant (REF100) is not completely vaporized and a residual liquid refrigerant (REF100) is present, so that the electric control device (ECU100) operatively controls the drive circuit device (CD100) to regulate the refrigerant jetting device (IJ100) to reduce the jetting amount of the refrigerant (REF100) into the evaporator (EVA100);

a compression pump (PUMP100), which is a fluid compression pump to be rotationally or reciprocally driven by a mechanical force or motor force or a hydrodynamic motor or engine or an electromagnetic coil for compressing the gas refrigerant (REF100) from the evaporator (EVA100) to the condenser (CON100) so as to convert the same into a liquid phase;

the condenser (CON100), formed by a material of a good heat conductivity, having a space formed therein so as to allow the refrigerant (REF100) to pass through;

a pressure reduction throttle device (R100): formed by an expansion valve or capillary device or level control device for pressure reduction and throttling of the refrigerant from the condenser (CON100), and disposed between the condenser (CON100) and the refrigerant jetting device (IJ100);

a pipe (P100), coupling the refrigerant jetting device (IJ100), the evaporator (EVA100), the compression pump (PUMP100), the condenser (CON100) for circulating the refrigerant (REF100) therein.

Figure 13:
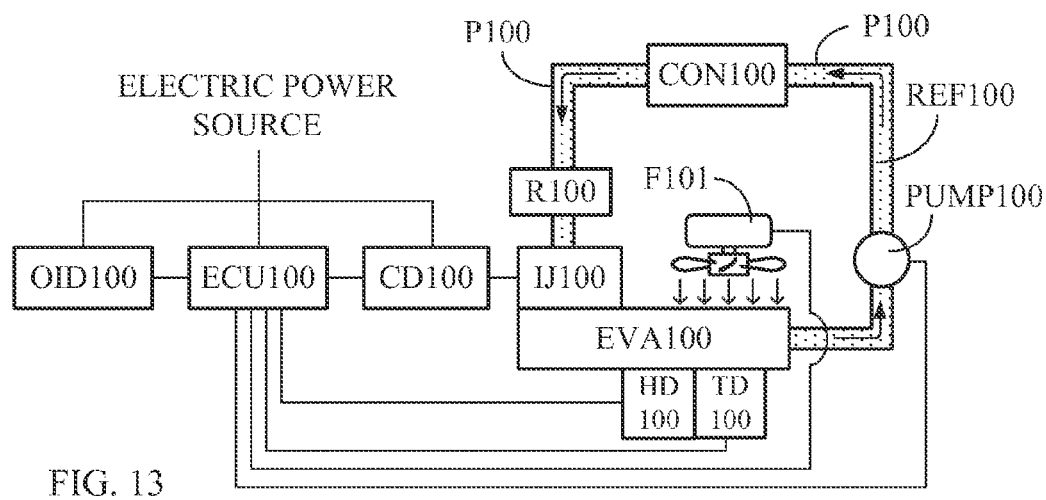
FIG. 13 is a schematic view of the system configuration of FIG. 5 in which a pressure reduction throttle device (R100) is added.

FIG. 13 is a schematic view of the system configuration of FIG. 5 in which a pressure reduction throttle device (R100) is added.

As shown in FIG. 13, the temperature regulation system mainly comprises:

an operation input device (OID100), formed by a manually operative electromechanical interface or a circuit device inputted by an analog or digital operation signal, for performing the actuation/shutdown of the system, selecting the operation modes, setting the regulation temperature, and setting the amount of an airflow when a fan is provided, etc.;

a temperature detection device (TD100), detecting the temperature generated from the evaporator so as to supply the same to an electric control device (ECU100);

an electric control device (ECU100), formed by an electromechanical operation device, a solid electronic circuit device and a microprocessor and related softwares so as to receive and process a command from the operation input device (OID100), the detection signal of a temperature detection device (TD100), and the detection signal of a liquid refrigerant detection device (HD100), for operating a drive circuit device (CD100) to further drive a refrigerant jetting device (IJ100), thereby controlling the timing of a liquid refrigerant (REF100) from a condenser (CON100) through the refrigerant jetting device (IJ100) to pressurize and jet the same into an interior of an evaporator (EVA100);

the drive circuit device (CD100), receiving the operation command from the electric control device (ECU100) to drive the refrigerant jetting device (IJ100), spraying the liquid refrigerant (REF100) from a condenser (CON100) into the evaporator (EVA100) in a fixed or periodical scan driving direction with a pressurized jetting set amount and set intensity in the form of a stream or fine particles or fine mists;

the refrigerant jetting device (IJ100), provided with one or more than one active pressurized jetting device driven by mechanical force or electromagnetic force or magnetostriction or piezoelectric effect, incorporated with the evaporator (EVA100) or formed integrally with the evaporator (EVA100) so as to be driven by the drive circuit device (CD100), for spraying the liquid refrigerant (REF100) from the pressure reduction throttle device (R100) into the evaporator (EVA100) in the fixed or periodical scan driving direction, with the pressurized jetting set amount and set intensity in the form of a stream or fine particles or fine mists;

the evaporator (EVA100), formed by a material of a good heat conductivity, having a space formed therein so as to allow a fluid to pass through, the evaporator (EVA100) being provided with the refrigerant jetting device (IJ100) for jetting the refrigerant (REF100) from the condenser (CON100), and an outlet for the escape of a vaporized gas refrigerant (REF100) or the discharge of an incompletely vaporized liquid refrigerant (REF100);

a liquid refrigerant detection device (HD100), disposed in the evaporator (EVA100) for detecting an evaporation status of the refrigerant (REF100) within the evaporator (EVA100), a signal being transmitted back to the electric control device (ECU100) when the refrigerant (REF100) is not completely vaporized and a residual liquid refrigerant (REF100) is present, so that the electric control device (ECU100) operatively controls the drive circuit device (CD100) to regulate the refrigerant jetting device (IJ100) to reduce the jetting amount of the refrigerant (REF100) into the evaporator (EVA100);

a compression pump (PUMP100), which is a fluid compression pump to be rotationally or reciprocally driven by a mechanical force or motor force or a hydrodynamic motor or engine or an electromagnetic coil for compressing the gas refrigerant (REF100) from the evaporator (EVA100) to the condenser (CON100) so as to convert the same into a liquid phase;

the condenser (CON100), formed by a material of a good heat conductivity, having a space formed therein so as to allow the refrigerant (REF100) to pass through;

a pressure reduction throttle device (R100): formed by an expansion valve or capillary device or liquid level control device for pressure reduction and throttling of the refrigerant from the condenser (CON100), and disposed between the condenser (CON100) and the refrigerant jetting device (IJ100);

a pipe (P100), coupling the refrigerant jetting device (IJ100), the evaporator (EVA100), the compression pump (PUMP100), the condenser (CON100) for circulating the refrigerant (REF100) therein;

a fan (F101): driven by an electric motor or mechanical rotational force so as to blow the airflow through the evaporator (EVA100), so that the airflow is discharged after the heat exchange with the evaporator (EVA100).

Figure 14:
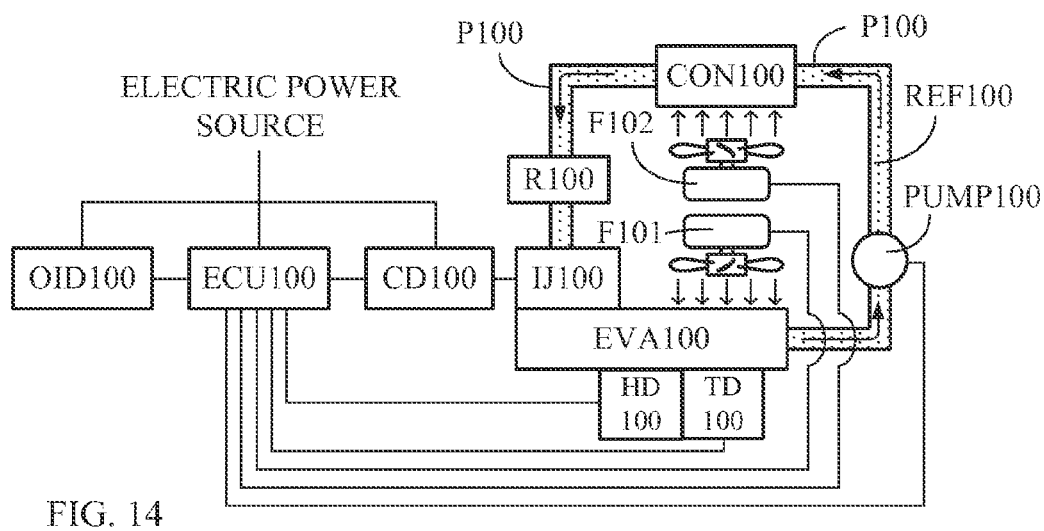
FIG. 14 is a schematic view of the system configuration of FIG. 6 in which a pressure reduction throttle device (R100) is added.

FIG. 14 is a schematic view of the system configuration of FIG. 6 in which a pressure reduction throttle device (R100) is added.

As shown in FIG. 14, the temperature regulation system mainly comprises:

an operation input device (OID100), formed by a manually operative electromechanical interface or a circuit device inputted by an analog or digital operation signal, for performing the actuation/shutdown of the system, selecting the operation modes, setting the regulation temperature, and setting the amount of an airflow when a fan is provided, etc.;

a temperature detection device (TD100), detecting the temperature generated from the evaporator so as to supply the same to an electric control device (ECU100);

an electric control device (ECU100), formed by an electromechanical operation device, a solid electronic circuit device and a microprocessor and related softwares so as to receive and process a command from the operation input device (OID100), the detection signal of a temperature detection device (TD100), and the detection signal of a liquid refrigerant detection device (HD100), for operating a drive circuit device (CD100) to further drive a refrigerant jetting device (IJ100), thereby controlling the timing of a liquid refrigerant (REF100) from a condenser (CON100) through the refrigerant jetting device (IJ100) to pressurize and jet the same into an interior of an evaporator (EVA100);

the drive circuit device (CD100), receiving the operation command from the electric control device (ECU100) to drive the refrigerant jetting device (IJ100), spraying the liquid refrigerant (REF100) from a condenser (CON100) into the evaporator (EVA100) in a fixed or periodical scan driving direction with a pressurized jetting set amount and set intensity in the form of a stream or fine particles or fine mists;

the refrigerant jetting device (IJ100), provided with one or more than one active pressurized jetting device driven by mechanical force or electromagnetic force or magnetostriction or piezoelectric effect, incorporated with the evaporator (EVA100) or formed integrally with the evaporator (EVA100) so as to be driven by the drive circuit device (CD100), for spraying the liquid refrigerant (REF100) from the pressure reduction throttle device (R100) into the evaporator (EVA100) in the fixed or periodical scan driving direction, with the pressurized jetting set amount and set intensity in the form of a stream or fine particles or fine mists;

the evaporator (EVA100), formed by a material of a good heat conductivity, having a space formed therein so as to allow a fluid to pass through, the evaporator (EVA100) being provided with the refrigerant jetting device (IJ100) for jetting the refrigerant (REF100) from the condenser (CON100), and an outlet for the escape of a vaporized gas refrigerant (REF100) or the discharge of an incompletely vaporized liquid refrigerant (REF100);

a liquid refrigerant detection device (HD100), disposed in the evaporator (EVA100) for detecting an evaporation status of the refrigerant (REF100) within the evaporator (EVA100), a signal being transmitted back to the electric control device (ECU100) when the refrigerant (REF100) is not completely vaporized and a residual liquid refrigerant (REF100) is present, so that the electric control device (ECU100) operatively controls the drive circuit device (CD100) to regulate the refrigerant jetting device (IJ100) to reduce the jetting amount of the refrigerant (REF100) into the evaporator (EVA100);

a compression pump (PUMP100), which is a fluid compression pump to be rotationally or reciprocally driven by a mechanical force or motor force or a hydrodynamic motor or engine or an electromagnetic coil for compressing the gas refrigerant (REF100) from the evaporator (EVA100) to the condenser (CON100) so as to convert the same into a liquid phase;

the condenser (CON100), formed by a material of a good heat conductivity, having a space formed therein so as to allow the refrigerant (REF100) to pass through;

a pressure reduction throttle device (R100): formed by an expansion valve or capillary device or liquid level control device for pressure reduction and throttling of the refrigerant from the condenser (CON100), and disposed between the condenser (CON100) and the refrigerant jetting device (IJ100);

a pipe (P100), coupling the refrigerant jetting device (IJ100), the evaporator (EVA100), the compression pump (PUMP100), the condenser (CON100) for circulating the refrigerant (REF100) therein;

a fan (F101): driven by an electric motor or mechanical rotational force so as to blow the airflow through the evaporator (EVA100), so that the airflow is discharged after the heat exchange with the evaporator (EVA100);

a fan (F102), driven by an electric motor or mechanical rotational force, and arranged to blow the airflow through the condenser (CON100) such that the condenser (CON100) performs heat exchange with the airflow.

Figure 15:
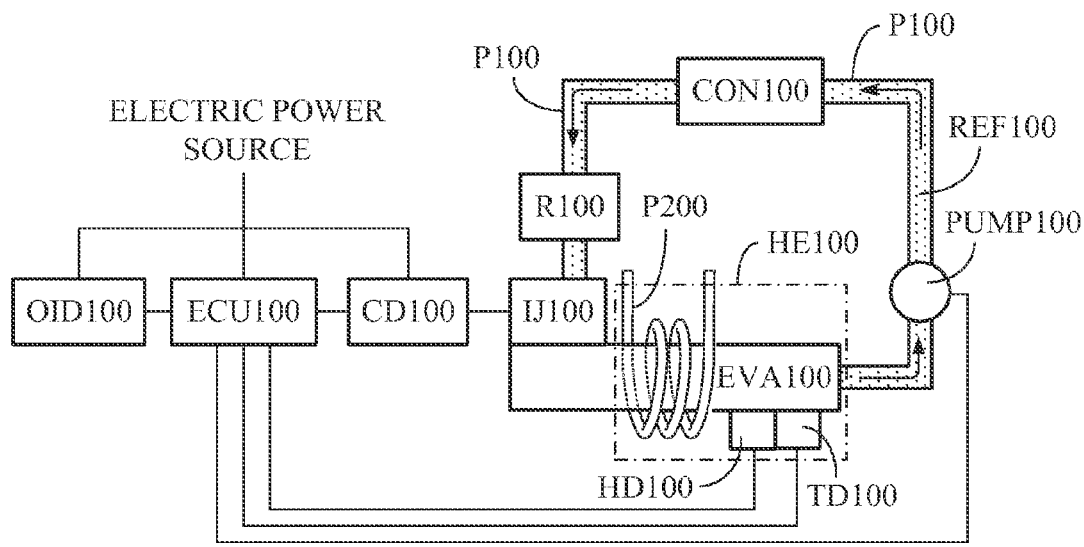
FIG. 15 is a schematic view of the system configuration of FIG. 7 in which a pressure reduction throttle device (R100) is added.

FIG. 15 is a schematic view of the system configuration of FIG. 7 in which a pressure reduction throttle device (R100) is added.

As shown in FIG. 15, the temperature regulation system mainly comprises:

an operation input device (OID100), formed by a manually operative electromechanical interface or a circuit device inputted by an analog or digital operation signal, for performing the actuation/shutdown of the system, selecting the operation modes, setting the regulation temperature, and setting the amount of an airflow when a fan is provided, etc.;

a temperature detection device (TD100), detecting the temperature generated from the evaporator so as to supply the same to an electric control device (ECU100);

an electric control device (ECU100), formed by an electromechanical operation device, a solid electronic circuit device and a microprocessor and related softwares so as to receive and process a command from the operation input device (OID100), the detection signal of a temperature detection device (TD100), and the detection signal of a liquid refrigerant detection device (HD100), for operating a drive circuit device (CD100) to further drive a refrigerant jetting device (IJ100), thereby controlling the timing of a liquid refrigerant (REF100) from a condenser (CON100) through the refrigerant jetting device (IJ100) to pressurize and jet the same into an interior of an evaporator (EVA100);

the drive circuit device (CD100), receiving the operation command from the electric control device (ECU100) to drive the refrigerant jetting device (IJ100), spraying the liquid refrigerant (REF100) from a condenser (CON100) into the evaporator (EVA100) in a fixed or periodical scan driving direction with a pressurized jetting set amount and set intensity in the form of a stream or fine particles or fine mists;

the refrigerant jetting device (IJ100), provided with one or more than one active pressurized jetting device driven by mechanical force or electromagnetic force or magnetostriction or piezoelectric effect, incorporated with the evaporator (EVA100) or formed integrally with the evaporator (EVA100) so as to be driven by the drive circuit device (CD100), for spraying the liquid refrigerant (REF100) from the pressure reduction throttle device (R100) into the evaporator (EVA100) in the fixed or periodical scan driving direction, with the pressurized jetting set amount and set intensity in the form of a stream or fine particles or fine mists;

the evaporator (EVA100), formed by a material of a good heat conductivity, having a space formed therein so as to allow a fluid to pass through, the evaporator (EVA100) being provided with the refrigerant jetting device (IJ100) for jetting the refrigerant (REF100) from the condenser (CON100), and an outlet for the escape of a vaporized gas refrigerant (REF100) or the discharge of an incompletely vaporized liquid refrigerant (REF100);

a liquid refrigerant detection device (HD100), disposed in the evaporator (EVA100) for detecting an evaporation status of the refrigerant (REF100) within the evaporator (EVA100), a signal being transmitted back to the electric control device (ECU100) when the refrigerant (REF100) is not completely vaporized and a residual liquid refrigerant (REF100) is present, so that the electric control device (ECU100) operatively controls the drive circuit device (CD100) to regulate the refrigerant jetting device (IJ100) to reduce the jetting amount of the refrigerant (REF100) into the evaporator (EVA100);

a compression pump (PUMP100), which is a fluid compression pump to be rotationally or reciprocally driven by a mechanical force or motor force or a hydrodynamic motor or engine or an electromagnetic coil for compressing the gas refrigerant (REF100) from the evaporator (EVA100) to the condenser (CON100) so as to convert the same into a liquid phase;

the condenser (CON100), formed by a material of a good heat conductivity, having a space formed therein so as to allow the refrigerant (REF100) to pass through;

a pressure reduction throttle device (R100): formed by an expansion valve or capillary device or liquid level control device for pressure reduction and throttling of the refrigerant from the condenser (CON100), and disposed between the condenser (CON100) and the refrigerant jetting device (IJ100);

a pipe (P100), coupling the refrigerant jetting device (IJ100), the evaporator (EVA100), the compression pump (PUMP100), the condenser (CON100) for circulating the refrigerant (REF100) therein;

a heat-exchanging device (HE100), configured in a structure that the primary side evaporator (EVA100) and a secondary side pipe (P200) connect one another so as to transfer the thermal energy;

a secondary side pipe (P200), which is the secondary side pipe of the heat-exchanging device (HE100), for passing through a gas or liquid fluid.

Figure 16:
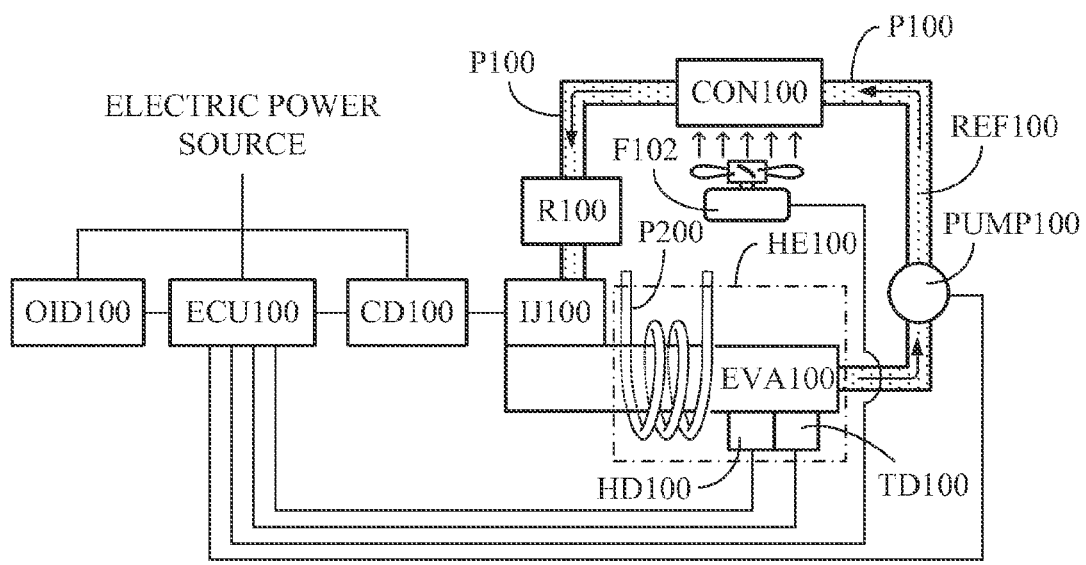
FIG. 16 is a schematic view of the system configuration of FIG. 8 in which a pressure reduction throttle device (R100) is added.

FIG. 16 is a schematic view of the system configuration of FIG. 8 in which a pressure reduction throttle device (R100) is added.

As shown in FIG. 16, the temperature regulation system mainly comprises:

an operation input device (OID100), formed by a manually operative electromechanical interface or a circuit device inputted by an analog or digital operation signal, for performing the actuation/shutdown of the system, selecting the operation modes, setting the regulation temperature, and setting the amount of an airflow when a fan is provided, etc.;

a temperature detection device (TD100), detecting the temperature generated from the evaporator so as to supply the same to an electric control device (ECU100);

an electric control device (ECU100), formed by an electromechanical operation device, a solid electronic circuit device and a microprocessor and related softwares so as to receive and process a command from the operation input device (OID100), the detection signal of a temperature detection device (TD100), and the detection signal of a liquid refrigerant detection device (HD100), for operating a drive circuit device (CD100) to further drive a refrigerant jetting device (IJ100), thereby controlling the timing of a liquid refrigerant (REF100) from a condenser (CON100) through the refrigerant jetting device (IJ100) to pressurize and jet the same into an interior of an evaporator (EVA100);

the drive circuit device (CD100), receiving the operation command from the electric control device (ECU100) to drive the refrigerant jetting device (IJ100), spraying the liquid refrigerant (REF100) from a condenser (CON100) into the evaporator (EVA100) in a fixed or periodical scan driving direction with a pressurized jetting set amount and set intensity in the form of a stream or fine particles or fine mists;

the refrigerant jetting device (IJ100), provided with one or more than one active pressurized jetting device driven by mechanical force or electromagnetic force or magnetostriction or piezoelectric effect, incorporated with the evaporator (EVA100) or formed integrally with the evaporator (EVA100) so as to be driven by the drive circuit device (CD100), for spraying the liquid refrigerant (REF100) from the pressure reduction throttle device (R100) into the evaporator (EVA100) in the fixed or periodical scan driving direction, with the pressurized jetting set amount and set intensity in the form of a stream or fine particles or fine mists;

the evaporator (EVA100), formed by a material of a good heat conductivity, having a space formed therein so as to allow a fluid to pass through, the evaporator (EVA100) being provided with the refrigerant jetting device (IJ100) for jetting the refrigerant (REF100) from the condenser (CON100), and an outlet for the escape of a vaporized gas refrigerant (REF100) or the discharge of an incompletely vaporized liquid refrigerant (REF100);

a liquid refrigerant detection device (HD100), disposed in the evaporator (EVA100) for detecting an evaporation status of the refrigerant (REF100) within the evaporator (EVA100), a signal being transmitted back to the electric control device (ECU100) when the refrigerant (REF100) is not completely vaporized and a residual liquid refrigerant (REF100) is present, so that the electric control device (ECU100) operatively controls the drive circuit device (CD100) to regulate the refrigerant jetting device (IJ100) to reduce the jetting amount of the refrigerant (REF100) into the evaporator (EVA100);

a compression pump (PUMP100), which is a fluid compression pump to be rotationally or reciprocally driven by a mechanical force or motor force or a hydrodynamic motor or engine or an electromagnetic coil for compressing the gas refrigerant (REF100) from the evaporator (EVA100) to the condenser (CON100) so as to convert the same into a liquid phase;

the condenser (CON100), formed by a material of a good heat conductivity, having a space formed therein so as to allow the refrigerant (REF100) to pass through;

a pressure reduction throttle device (R100): formed by an expansion valve or capillary device or level control device for pressure reduction and throttling of the refrigerant from the condenser (CON100), and disposed between the condenser (CON100) and the refrigerant jetting device (IJ100);

a pipe (P100), coupling the refrigerant jetting device (IJ100), the evaporator (EVA100), the compression pump (PUMP100), the condenser (CON100) for circulating the refrigerant (REF100) therein;

a heat-exchanging device (HE100), configured in a structure that the primary side evaporator (EVA100) and a secondary side pipe (P200) connect one another so as to transfer the thermal energy;

a secondary side pipe (P200), which is the secondary side pipe of the heat-exchanging device (HE100), for passing through a gas or liquid fluid;

a fan (F102), driven by an electric motor or mechanical rotational force, and arranged to blow the airflow through the condenser (CON100) such that the condenser (CON100) performs heat exchange with the airflow.

The temperature regulation system with active jetting type refrigerant supply and regulation, in practical application, has various configurations as follows:

In the temperature regulation system with active jetting type refrigerant supply and regulation, the refrigerant jetting device (IJ100) disposed on the evaporator (EVA100) includes constituted by one or more refrigerant jetting device.

In the temperature regulation system with active jetting type refrigerant supply and regulation, the refrigerant jetting device (IJ100) and the evaporator (EVA100) includes the two are separately structures or the two are formed in an integral structure.

In the temperature regulation system with active jetting type refrigerant supply and regulation, the refrigerant jetting device (IJ100) disposed on the evaporator (EVA100) includes a refrigerant jetting device separately or integrally formed with a pressure reduction throttle device (R100).

In the temperature regulation system with active jetting type refrigerant supply and regulation, the drive circuit device (CD100) further enables to operatively control the refrigerant jetted by the refrigerant jetting device (IJ100) to be in the form of a stream or fine particles or in the form of fine mists.

In the temperature regulation system with active jetting type refrigerant supply and regulation, the drive circuit device (CD100) can further control the jetting direction of the refrigerant jetting device (IJ100) to be in a continuous or an indirect or a jet direction varied periodical scan manner.

The temperature regulation system with active jetting type refrigerant supply and regulation includes to be applied in the integrated or separate heating and cooling air conditioning, ice water air conditioning, refrigerator, refrigeration or the application device of temperature-regulating for cooling or heating, dehumidifying.

The invention claimed is:

1. A temperature regulation system, comprising:
   a condenser (CON100);
   an evaporator (EVA100);
   a pipe (P100) for circulating a refrigerant (REF100) between the condenser (CON100) and the evaporator (EVA100);
   at least one refrigerant injection device (IJ100) connected to the condenser (CON100) by a section of the pipe (P100), and said at least one refrigerant injection device (IJ100) being incorporated in or formed integrally with the evaporator (EVA100) for injecting refrigerant (REF100) into the evaporator (EVA100), and said refrigerant injection device including at least one pressurizing injector for increasing a pressure of the refrigerant (REF100) supplied by the condenser (CON100) before injection of the refrigerant into the evaporator, wherein the at least one pressurizing injector of the refrigerant injection device (IJ100) is one of a mechanical, electromagnetic, magnetostrictive, and piezoelectric injector;
a drive circuit device (CD100) connected to the at least one refrigerant injection device (IJ100) for controlling an amount and intensity of the refrigerant (REF100) injected into the evaporator (EVA100) in a fixed or periodic scan driving direction, said refrigerant (REF100) being sprayed into the evaporator as one of a refrigerant stream, fine particles, or mist;
a fluid compression pump (PUMP100) connected to an outlet of the evaporator (EVA100), said outlet enabling escape of a vaporized or incompletely vaporized said refrigerant (REF100), for compressing the vaporized said refrigerant (REF100) and supplying vaporized and compressed said refrigerant (REF100) to the condenser (CON100) for conversion to said liquid;
an operation input device (OID100) for inputting operation signals to control actuation or stopping of the system, select operation modes, regulate temperature settings, and set an air output level when a fan is installed; and
an electric control unit (ECU100) connected to receive the operation signals from the operation input device (OID100) and for supplying control signals to the driving circuit device (CD100) to control a pressurization and injection timing of the injection device (IJ100) in order to control said injection amount and intensity.

2. A temperature regulation system as claimed in claim 1, further comprising a temperature detector (TD100) for detecting a temperature of the evaporator, wherein said electronic control unit (ECU100) controls said driving circuit device (CD100) in response to temperature detection signals from the temperature detector (TD100).

3. A temperature regulation system as claimed in claim 1, further comprising a liquid refrigerant detector (HD100) installed in the evaporator for detecting an evaporation state of the refrigerant (REF100) and, when the refrigerant (REF100) is not completely evaporated, sending a feedback signal to the electric control unit (ECU100) to control the driving circuit device (CD100) to reduce an amount of refrigerant (REF100) injected by the injection device (IJ100) into the evaporator (EVA100).

4. A temperature regulation system as claimed in claim 3, further comprising a temperature detector (TD100) for detecting a temperature of the evaporator (EVA100), wherein said electronic control unit (ECU100) controls said driving circuit device (CD100) in response to temperature detection signals from the temperature detector (TD100).

5. A temperature regulation system as claimed in claim 4, further comprising a fan (F101) for blowing air through the evaporator (EVA100), said fan (F101) being controlled by the electric control unit (ECU100) in response to feedback from at least one of the temperature detector (TD100) and the liquid refrigerant detector (HD100).

6. A temperature regulation system as claimed in claim 5, further comprising a second fan (F102) controlled by the electric control unit (ECU100) for blowing air through the condenser (CON100).

7. A temperature regulation system as claimed in claim 1, wherein the evaporator (EVA100) is included in a heat exchanger (HE100) having a secondary side pipeline (P200), the heat exchanger (HE100) transferring heat between the refrigerant (REF100) in the evaporator (EVA100) and a fluid in the secondary side pipeline (P200).

8. A temperature regulation system as claimed in claim 7, further comprising a liquid refrigerant detector (HD100) installed in the evaporator (EVA100) for detecting an evaporation state of the refrigerant (REF100) and, when the refrigerant (REF100) is not completely evaporated, sending a feedback signal to the electric control unit (ECU100) to control the drive circuit device (CD100) to reduce an amount of refrigerant (REF100) injected into the evaporator (EVA100).

9. A temperature regulation system as claimed in claim 8, further comprising a temperature detector (TD100) for detecting a temperature of the evaporator (EVA100), wherein said electronic control unit (ECU100) controls said driving circuit device (CD100) in response to temperature detection signals from the temperature detector (TD100).

10. A temperature regulation system as claimed in claim 9, further comprising a fan (F102) controlled by the electric controlled by the electric control unit (ECU100) for blowing air through the condenser (CON100).

11. A temperature regulation system as claimed in claim 1, further comprising a pressure reduction throttle device (R100) connected between the condenser (CON100) and the injection device (IJ100) and comprising one of an expansion valve, a capillary device, and a liquid level control device for reducing a pressure and throttling of said refrigerant (REF100) supplied in a liquid state from the condenser (CON100) to the injection device (IJ100).

12. A temperature regulation system as claimed in claim 11, further comprising a temperature detector (TD100) for detecting a temperature of the evaporator, wherein said electronic control unit (ECU100) controls said driving circuit device (CD100) in response to temperature detection signals from the temperature detector (TD100).

13. A temperature regulation system as claimed in claim 11, further comprising a liquid refrigerant detector (HD100) installed in the evaporator for detecting an evaporation state of the refrigerant (REF100) and, when the refrigerant (REF100) is not completely evaporated, sending a feedback signal to the electric control unit (ECU100) to control the driving circuit device (CD100) to reduce an amount of refrigerant (REF100) injected by the injection device (IJ100) into the evaporator (EVA100).

14. A temperature regulation system as claimed in claim 13, further comprising a temperature detector (TD100) for detecting a temperature of the evaporator (EVA100), wherein said electronic control unit (ECU100) controls said driving circuit device (CD100) in response to temperature detection signals from the temperature detector (TD100).

15. A temperature regulation system as claimed in claim 14, further comprising a fan (F101) for blowing air through the evaporator (EVA100), said fan (F101) being controlled by the electric control unit (ECU100) in response to feedback from at least one of the temperature detector (TD100) and the liquid refrigerant detector (HD100).

16. A temperature regulation system as claimed in claim 15, further comprising a second fan (F102) controlled by the electric control unit (ECU100) for blowing air through the condenser (CON100).

17. A temperature regulation system as claimed in claim 11, wherein the evaporator (EVA100) is included in a heat exchanger (HE100) having a secondary side pipeline (P200), the heat exchanger (HE100) transferring heat between the refrigerant (REF100) in the evaporator (EVA100) and a fluid in the secondary side pipeline (P200).

18. A temperature regulation system as claimed in claim 17, further comprising a liquid refrigerant detector (HD100) installed in the evaporator (EVA100) for detecting an evaporation state of the refrigerant (REF100) and, when the refrigerant (REF100) is not completely evaporated, sending a feedback signal to the electric control unit (ECU100) to control the drive circuit device (CD100) to reduce an amount of refrigerant (REF100) injected into the evaporator (EVA100).

19. A temperature regulation system as claimed in claim 18, further comprising a temperature detector (TD100) for detecting a temperature of the evaporator (EVA100), wherein said electronic control unit (ECU100) controls said driving circuit device (CD100) in response to temperature detection signals from the temperature detector (TD100).

20. A temperature regulation system as claimed in claim 19, further comprising a fan (F102) controlled by the electric controlled by the electric control unit (ECU100) for blowing air through the condenser (CON100).

21. A temperature regulation system as claimed in claim 1, wherein the system is included in one of an air conditioner, refrigerator, and freezer.

* * * * *